(12) United States Patent
Wakabayashi et al.

(10) Patent No.: US 12,044,931 B2
(45) Date of Patent: Jul. 23, 2024

(54) LIQUID CRYSTAL DISPLAY DEVICE (71) Applicant: Japan Display Inc., Tokyo (JP)

(72) Inventors: Yuta Wakabayashi, Tokyo (JP); Yasuyuki Hanazawa, Tokyo (JP); Michikazu Noguchi, Tokyo (JP); Ryou Shimmen, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/195,387

(22) Filed: May 10, 2023

(65) Prior Publication Data

US 2023/0367154 A1 Nov. 16, 2023

(30) Foreign Application Priority Data

May 11, 2022 (JP) .................. 2022-077899

(51) Int. Cl.
G02F 1/1335 (2006.01)
G02F 1/1333 (2006.01)
G02F 1/1334 (2006.01)
G02F 1/13357 (2006.01)
G02F 1/1345 (2006.01)

(52) U.S. Cl.
CPC .. *G02F 1/133628* (2021.01); *G02F 1/133331* (2021.01); *G02F 1/133385* (2013.01); *G02F 1/1334* (2013.01); *G02F 1/133615* (2013.01); *G02F 1/13452* (2013.01); *G02F 1/133622* (2021.01); *G02F 2203/01* (2013.01)

(58) Field of Classification Search
CPC ......... G02F 1/133628; G02F 1/133331; G02F 1/133385; G02F 1/1334; G02F 1/133615; G02F 1/13452; G02F 1/133622

USPC .......................................................... 349/65
See application file for complete search history.

(56) References Cited

U.S. PATENT DOCUMENTS

2014/0132857 A1* 5/2014 Shitou ................. G02F 1/13338
445/24
2018/0031897 A1* 2/2018 Kikuchi ............ G02F 1/133512
2021/0364849 A1 11/2021 Kanesaka
2022/0357615 A1* 11/2022 Miyao ................. G02F 1/13306

FOREIGN PATENT DOCUMENTS

JP 2021-184052 A 12/2021

* cited by examiner

*Primary Examiner* — Dung T Nguyen
*Assistant Examiner* — David Y Chung
(74) *Attorney, Agent, or Firm* — XSENSUS LLP (57) ABSTRACT A display device has a display area and a terminal area, the terminal area being formed on the TFT area, in which the counter substrate does not overlap, a driver IC being disposed on the terminal area, a first heat dissipation plate being adhered to a back of the TFT substrate in a portion corresponding the terminal area, a second cover glass being disposed on the counter substrate, a first edge being disposed at an edge of the second cover glass, an LED as a light source being disposed at a second edge, which is an opposing edge to the first edge of the lens, a second heat dissipation plate, on which the lens and the LED are disposed, being disposed at a second cover glass side, in which the lens, the LED and the second heat dissipation plate are fixed to the TFT substrate through the first heat dissipation plate.

18 Claims, 11 Drawing Sheets

FIG. 15

LIQUID CRYSTAL DISPLAY DEVICE

CROSS-REFERENCE TO RELATED APPLICATION

The present application claims priority from Japanese Patent Application No. 2022-077899 filed on May 11, 2022, the content of which is hereby incorporated by reference into this application.

BACKGROUND OF THE INVENTION

(1) Field of the Invention

The present invention relates to a display device and, more particularly, to a transparent display device which uses a liquid crystal display device.

(2) Description of the Related Art

There is a need for a transparent display, in which a background is visible like glass. When display images are displayed in a transparent display device, a background can be overlapped with the display images when seen from front or back of the display device. In an area in which images are not displayed, a background is visible through glass. Such a transparent display can be realized by a liquid crystal display device. When a liquid crystal display device is used for the transparent display device, high transparency can be realized compared with when an OLED display devise is used in which many wrings and transistors exist.

In a transparent display device using a liquid crystal display device, LEDs (Light Emitting Diodes) as a light source and a driver IC for driving the display device are installed in a terminal area of the display device. Since both the LED and the driver IC become high temperature, if those components are disposed closely to each other, a temperature of a place, in which those components are disposed, becomes high. The patent document 1 discloses that a plurality of LEDs are disposed, but not aligned in line, so that two components are not disposed so close to each other.

PRIOR ART REFERENCE

Patent Document

[Patent document 1] Japanese Patent Application Publication 2021-184052

SUMMARY OF THE INVENTION

In a transparent liquid crystal display device, a direct back light cannot be used. Consequently, a side light type back light, in which a light source is disposed to, e.g., a side of the substrate, is used. LEDs are used in an actual back light; the LED generates heat as well as emits light. In the sidelight type, many LEDs are disposed in a small area, as at a side surface of the substrate, thus, rising of temperature is a problem.

In a transparent liquid crystal display device, a color filter is not used to raise a light utilizing efficiency. That is to say, a color filter decreases a light utilizing efficiency to ⅓. In addition, the color filter deteriorates a transmission of light. A field sequential method can eliminate a color filter; however, the field sequential method needs high frequency driving, thus, a heat generation in a driver IC becomes a problem.

A purpose of the present invention is, in a transparent liquid crystal display device of the side light type back light, to suppress a rising of temperature of the LED and the driver IC and so forth, and thus, to suppress a decrease in light emitting efficiency of the LED, to avoid malfunction of the driver IC, and to suppress deterioration of peripheral parts due to thermal expansion, and so forth.

Another purpose of the present invention is, in a transparent liquid crystal display device of the side light type back light, to increase incident light and to increase light utilization efficiency, thus, to enable to display images of high contrast with low power consumption.

The present invention realizes the above purposes; representative measures are as follows.

A liquid crystal display device in which liquid crystal is sandwiched between a TFT substrate, having a pixel, and a counter substrate, the liquid crystal display device including: a display area being formed in an area in which the TFT substrate and the counter substrate overlap each other, a terminal area being formed on the TFT substrate, in which the counter substrate does not overlap, a driver IC being disposed on the terminal area, a first heat dissipation plate being adhered to a back of the TFT substrate in a portion corresponding the terminal area, a second cover glass being disposed on the counter substrate, a first edge of a lens being disposed at an edge of the second cover glass, an LED as a light source being disposed at a second edge of the lens, which is an opposing edge to the first edge of the lens, and a second heat dissipation plate, on which the lens and the LED are disposed, being disposed at a second cover glass side, in which the lens, the LED and the second heat dissipation plate are fixed to the TFT substrate through the first heat dissipation plate.

(2) The liquid crystal display device according to (1), in which the second edge of the lens, which opposes to the LED, is located at an outer side than an edge of the TFT substrate with respect to the display area.

(3) The liquid crystal display device according to (1), in which the second cover glass covers the driver IC.

(4) The liquid crystal display device according to (1), in which a cross section of the second heat dissipation plate has a bent structure, the lens is disposed on a first surface of the second heat dissipation plate, the LED is attached to a LED substrate, and the LED substrate is attached to a second surface of the second heat dissipation plate.

(5) The liquid crystal display device according to (4), in which the first surface is parallel to a major surface of the counter substrate, and the second surface is orthogonal to the major surface of the counter substrate.

(6) The liquid crystal display device according to (5), in which a first cover glass is adhered to a back of the TFT substrate corresponding to the display area.

The liquid crystal display device according to (1), in which a flexible wiring substrate is connected to the terminal area of the TFT substrate, a spacer is formed on the terminal area except a place in which the driver IC and the flexible wiring substrate are disposed.

(8) The liquid crystal display device according to (7), in which the second heat dissipation plate has a third surface, which is parallel to a major surface of the counter substrate, the first heat dissipation plate is connected with the third surface of the second heat dissipation plate through a third heat dissipation plate.

DETAILED DESCRIPTION OF THE PREFERRED EMBODIMENTS

The present invention is explained in detail by the following embodiments.

Embodiment 1

Figure 1:
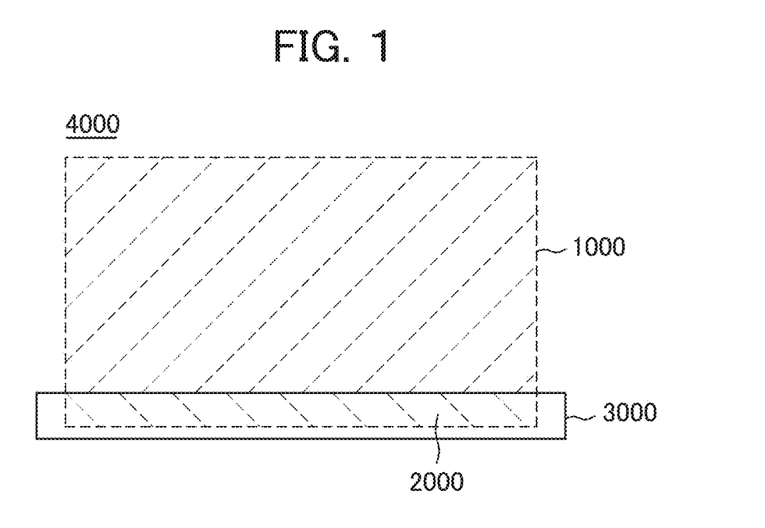
FIG. 1 is a front view of a transparent liquid crystal display device.
Figure 2:
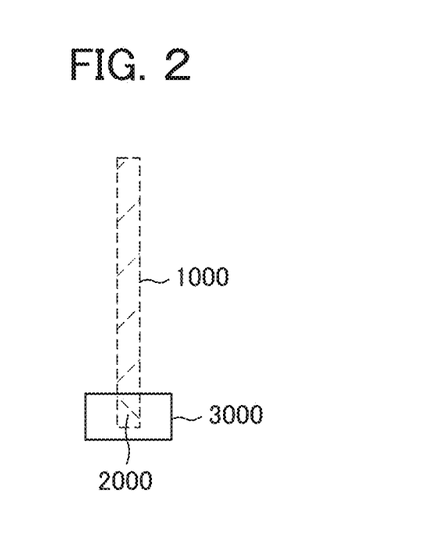
FIG. 2 is a side view of the transparent liquid crystal display device.

FIG. 1 is a front view of a transparent liquid crystal display device 4000; FIG. 2 is a side view of the transparent liquid crystal display device 4000. In FIGS. 1 and 2, a back light does not exist at a back of the display area 1000; since the substrate is formed from transparent glass, light can pass through the substrate in a normal state, and a background beyond the transparent liquid crystal display device 4000 is visible.

A driving part 2000, which includes a light source of a side light type and an area for a driving circuit, is disposed in the housing 3000 at the bottom. Images displayed in the display area 1000 of the display panel are visible from both sides, a back side and a front side, of the display area 1000. Images displayed in the transparent liquid crystal display device can give an illusion as that it is projected in the background.

Figure 3:
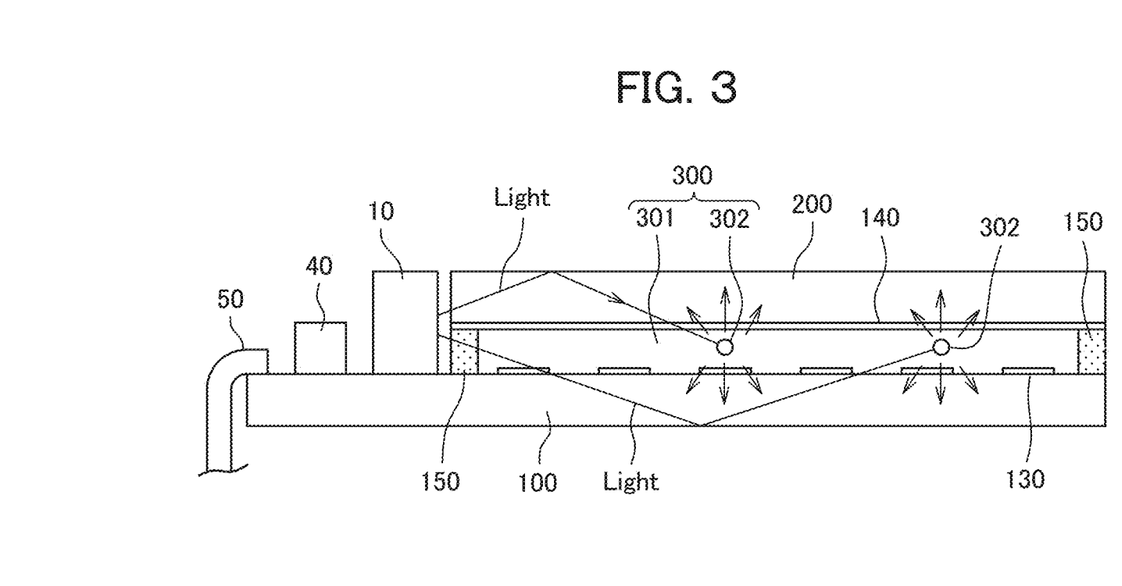
FIG. 3 is a cross sectional view to explain a function of the transparent liquid crystal display panel.

FIG. 3 is a cross sectional view to show a function of the transparent liquid crystal display device 4000. FIG. 3 is a basic structure of the transparent liquid crystal display device. In FIG. 3, the liquid crystal 300 is sandwiched between the TFT substrate 100, on which pixel electrodes 130, signal wirings, TFTs and so forth are disposed, and the counter substrate 200, on which a common electrode 140 is disposed. In FIG. 3, the transparent liquid crystal display device does not have color filters because it is driven by so called field sequential method. The display area is formed in a place in which the TFT substrate 100 and the counter substrate 200 overlap each other; the terminal area is formed on the TFT substrate 100 in an area, in which the counter substrate 200 does not overlap the TFT substrate 100.

Figure 4:
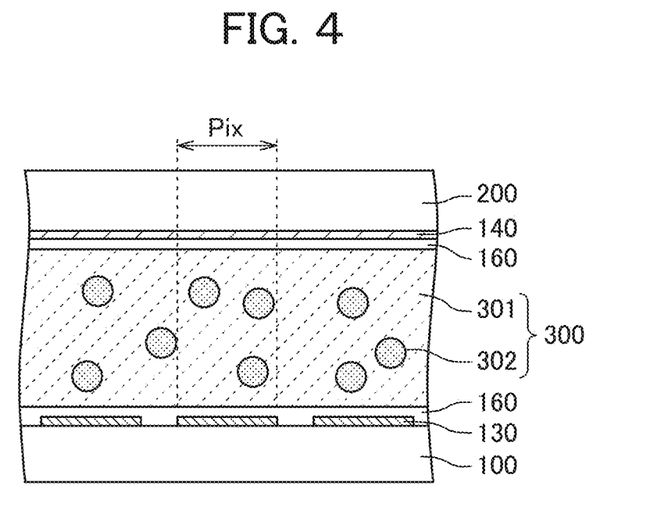
FIG. 4 is a detailed cross-sectional view of a liquid crystal layer.

In FIG. 3, the TFT substrate 100 and the counter substrate 200 are adhered to each other by a seal material 150; the liquid crystal 300 is sealed thereinside. The seal material 150 is formed from a transparent resin. The liquid crystal 300 in FIG. 3 is so called polymer dispersed liquid crystal; FIG. 4 shows the structure of polymer dispersed liquid crystal. FIG. 4 is an enlarged cross-sectional view of FIG. 3 at the liquid crystal portion. In FIG. 4, the liquid crystal 300 is sandwiched between the TFT substrate 100, on which pixel electrodes 130 and an alignment film 160 are formed, and the counter substrate 200, on which the common electrode 140 and the alignment film 160 are formed. In FIG. 4, the pixel Pix is formed corresponding to the pixel electrode 130.

The liquid crystal 300 is so called polymer dispersed liquid crystal, which is constituted from a bulk 301 formed from high molecular (polymer) and fine particles 302 containing liquid crystal molecules. When a voltage is applied between the pixel electrode 130 and the common electrode 140, the fine particles 302, which contain liquid crystal molecules, rotate and scatter the light. When a voltage is not applied between the pixel electrode 130 and the common electrode 140, the light is not scattered. Since the scattering of the light is controlled in each of the pixels, images can be formed. The images are visible from both a front side and a back side of the liquid crystal panel.

Back to FIG. 3, the TFT substrate 100 is made larger than the counter substrate 200; the portion of the TFT substrate 100, on which the counter substrate 200 does not overlap is a terminal area. The LED 10, which is light source, is disposed opposing to a side surface of the counter substrate 200. Light from the LED 10 enters inside of the liquid crystal panel through the side surface of the counter substrate 200 or the seal material 150. The light collides the fine particles 302 containing liquid crystal molecules in the liquid crystal layer 300 after repeating total reflections in the liquid crystal panel.

When light collides a fine particle 302 located in a pixel in which a voltage is applied between the pixel electrode 130 and the common electrode 140, the light is scattered as shown in FIG. 3. On the other hand, light goes straight in a pixel in which a voltage is not applied between the pixel electrode 130 and the common electrode 140. Since a scattering of light, which entered the liquid crystal layer 300, is controlled in each of the pixels, display images are formed.

In FIG. 3, the driver IC 40 is juxtaposed with the LED 10. The driver IC 40 drives the liquid crystal panel, and it becomes high temperature during operation. Since the liquid crystal display device of FIG. 3 is driven by field sequential, data are processed in a speed of three times compared with a normal operation, therefore, heat generation in the driver IC 40 becomes higher.

At an edge of the TFT substrate 100, a flexible wiring substrate 50 is connected thereto to supply data and power to the driver IC 40. Although, in an actual display device, wiring substrate for the LEDs 10 exist to supply power to the LEDs 10, it is omitted in FIG. 3.

The problems in the transparent liquid crystal display device of the structure of FIG. 3 are as follows. The driver IC 40 and the LED 10 as alight source, which are both heat source, are disposed in close location each other. A heat generation in the driver IC 40 is high because the liquid crystal display panel of FIG. 3 is driven by field sequential. In addition, LEDs 10, which are light source, are aligned in a direction orthogonal to the sheet in FIG. 3. Therefore, temperature at this portion of the terminal area becomes very high. When temperature of an LED 10 becomes higher, light emitting efficiency of the LED 10 becomes lower; when temperature of a driver IC 40 becomes higher, malfunction in the driver IC 40 tends to occur, strains in peripheral components due to thermal expansion occur, dimensional accuracy is deteriorated, and the like.

Figure 5:
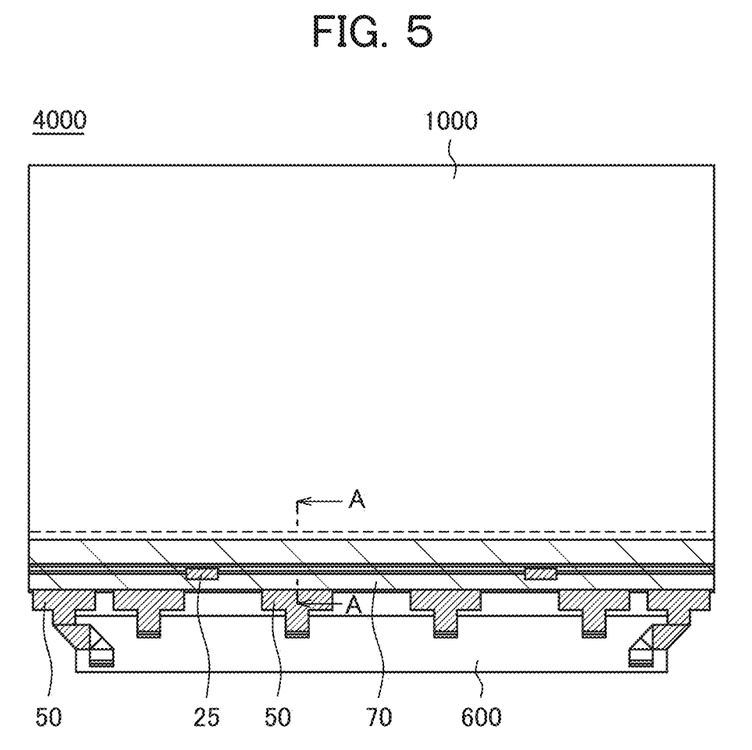
FIG. 5 is a front view of the transparent liquid crystal display device according to embodiment 1.

The structure of embodiment 1 shown in FIG. 5 and the following figures solves the above described problems, and thus, realizes a transparent liquid crystal display device of high performance and high reliability. FIG. 5 is a front view of the transparent liquid crystal display device 4000 according to embodiment 1. In FIG. 5, the transparent liquid crystal display device 4000 is formed from the display area 1000 and the driving area. The driving area is constituted from driving portion including light source 10 and the driver IC 40, the printed circuit board (PCB) 600 and the flexible wiring substrates 50. In FIG. 5, the driving portion is covered by a second heat dissipation plate 70 formed from metal. In embodiment 1, the second heat dissipation plate 70 is made from aluminum.

In FIG. 5, a socket 25 is disposed in two portions in the second heat dissipation plate 70. The sockets 25 are connected to the LED substrate, which is disposed inside of the second heat dissipation plate 70, and supply power to the LEDs. In FIG. 5, six flexible wiring substrates 50 are disposed. Among the six wiring substrates 50, outer most two of them are connected to a driver IC for scan lines, four of them are connected with a driver IC for video signal lines. Since heat generation in the driver IC for the video signal lines is larger than heat generation in the driver IC for the scan signal lines, a space between the flexible wiring substrates 50 for the driver IC for the video signal lines is larger than a space between the flexible wiring substrates 50 for the driver IC for the scan signal lines.

Figure 6:
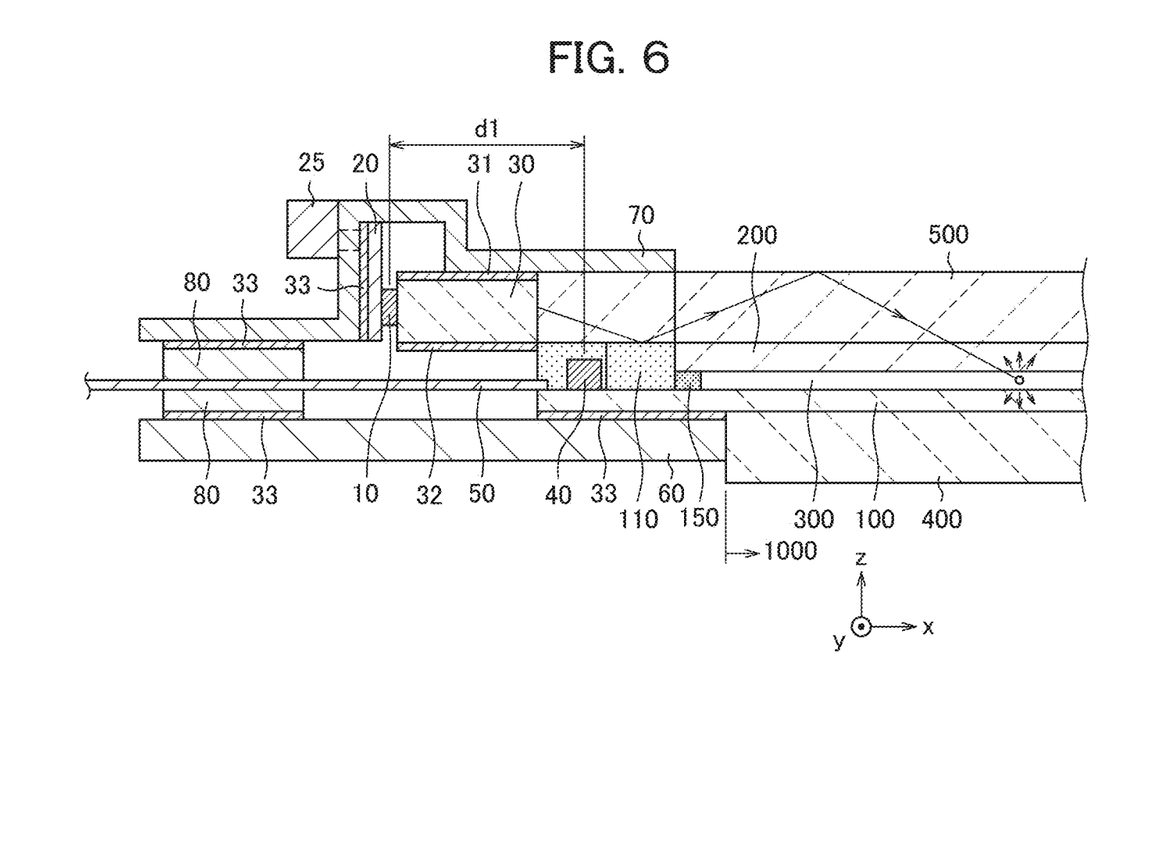
FIG. 6 is a cross sectional view of FIG. 5 along the line A-A.

FIG. 6 is a cross sectional view along the line A-A of FIG. 5, and a cross sectional view to show a structure of the driving portion. In FIG. 6, right hand area in the x direction is the display area 1000. In FIG. 6, the TFT substrate 100 and the counter substrate 200 are adhered to each other with seal material 150, and the liquid crystal 300 is sealed thereinside. At the bottom of the TFT substrate 100, a first cover glass 400 is disposed at an area corresponding to the display area 1000, a first heat radiating substrate 60 is disposed at an area corresponding to the driving portion. The first heat dissipation plate 60 is made of metal, a thickness is approximately 1 mm. The first heat dissipation plate 60 adheres to the TFT substrate 100, and extends to left hand direction in FIG. 6.

In FIG. 6, a second cover glass 500 is disposed on the top of the counter substrate 200. The second cover glass 500 is made larger than the counter substrate 200; an edge of the second cover glass 500 is approximately at the same position as an edge of the TFT substrate 100 in a plan view. Considering optical coupling, OCA (Optical Clear Adhesive) is used in an adhesion between the TFT substrate 100 and the first cover glass 400 and an adhesion between the counter substrate 200 and the second cover glass 500. By the way, a conductive sheet 33 is used between the first heat dissipation plate 60 and the TFT substrate 100 considering heat dissipation.

In FIG. 6, the driver IC 40 is disposed between the TFT substrate 100 and the second cover glass 500, in other words, in a terminal area of the TFT substrate 100; the flexible wiring substrate 50 is connected to the edge of the terminal area to supply signals and power to the liquid crystal display panel. A spacer 110 is disposed between the TFT substrate 100 and the counter substrate 200. The spacer 110 strengthen a mechanical strength of the TFT substrate 100 by adhering to the TFT substrate 100.

In FIG. 6, for an example, a thickness of the TFT substrate 100 is 0.5 mm, a thickness of the counter substrate 200 is 0.7 mm, a thickness of the first cover glass 400 is 3 mm and a thickness of the second cover glass 500 is 3 mm. A thickness of the liquid crystal layer 300 is 10 μm or less, which can be neglected compared with thicknesses of other components. A thickness of the spacer 110 is approximately the same as a thickness of the counter substrate 200.

In FIG. 6, a thickness of the TFT substrate 100 is thinner than a thickness of the counter substrate 200 so that heat generated in the driver IC 40 can conduct easily, through the TFT substrate 100, to the first heat dissipation plate 60 disposed at the bottom of the TFT substrate 100. Since a basic material of the conductive sheet 33, which is disposed between and adheres to the TFT substrate 100 and the first heat dissipation plate 60, is made from resin, it can contact flexibly with the TFT substrate 100 and the first cover glass 400, thus, a heat conduction to the first heat dissipation plate 60 can be made more effectively. By the way, a thickness of the counter substrate 200 is made thicker than a thickness of the TFT substrate 100, thus, a space between the TFT substrate 100 and the second cover glass 500 is made larger, consequently, dispositions of the driver IC 40 and so forth can be made more easily.

The conductive sheet 33 has a high heat conductivity as well as electrical conduction. The conductive sheet 33, which can be expressed as a conductive tape 33, has an adhesive at both sides; the conductive tape 33 is used to adhere and fix the first heat dissipation plate 60 to the TFT substrate 100 as will be explained later. In this embodiment, the conductive sheet 33 is used as a heat conduction sheet. A conductive sheet 33 is provided by many makers. A structure of the conductive sheet 33 is, for example, fine metal fibers formed in mesh are fixed by a resin, which is a basic material; another example of conductive sheet 33 is that electrical conductivity and heat conductivity of the sheet are improved by dispersing fine metal particles or carbon particles in the resin, and so forth.

The first heat dissipation plate 60 works as a heat sink because it is made of aluminum of a thickness of 1 mm. In addition, since aluminum has a high heat conductivity, heat dissipation to outside is made efficiently. As described above, the heat generated in the driver IC 40 is mainly absorbed in the first heat dissipation plate 60 and temperature rise in the driver IC 40 is mitigated.

In FIG. 6, the lens 30 is disposed at an edge of the second cover glass 500 in butting relation. The LED 10 as a light source is disposed at another edge of the lens 30. The light from the LED 10 is guided to the display area 1000 by the lens 30. Therefore, the lens 30 is sometimes called as a light guide, however, in this specification it is called as lens.

In FIG. 6, a thickness of the lens 30 in the vertical direction (the z direction) is approximately 3 mm, which is the same thickness as the second cover glass 500. Therefore, the light from the LED 10 can enter the lens 30 and subsequently the second cover glass 500 with enough area allowance. In addition, the amount of light can be increased when an area of entering surface for the light becomes larger, therefore, images of high contrast can be displayed.

In FIG. 6, the top surface of the lens 30 is fixed to the second heat dissipation plate 70, which is made of metal, and bent in cross sectional view. Aluminum is used as the metal in embodiment 1. A top surface of the lens 30 is disposed in suspension structure at a first surface of the second heat dissipation plate 70, which is parallel to the major surface of the counter substrate 200; alignment of the lens 30 is made via the second heat dissipation plate 70. Therefore, a dimensional accuracy of the second heat dissipation plate 70 and an alignment accuracy in assembling the other components and the second heat dissipation plate 70 together are important. A thickness of the second heat dissipation plate 70 is, for example, 0.5 mm.

A reflection sheet is disposed on the top of the lens 30 and a double-sided adhesive is used on the reflection sheet for adhesion (herein after, this structure is called an adhesion sheet 31) with the second heat dissipation plate 70. Alternatively, an adhesion sheet 31, in which a reflection sheet is disposed inside of the double adhesive film, can be used. In the meantime, since the lens 30 is disposed near the LED 10, which can be a heat source, it could become high temperature. In such a case, the adhesion sheet 31 can be a laminated sheet, in which a reflection sheet is formed at a side of the lens 30, a conductive sheet is formed at a side of the second heat dissipation plate 70. The heat of the lens 30 can be conducted easily to the second heat dissipation plate 70 if the conductive sheet 31 is used. In the meantime, a bottom surface of the lens 30 is required only to be a reflection surface, therefore, e.g., a reflection sheet 32, which can adhere with the lens 30, can be used.

In FIG. 6, the LED 10 as a light source is disposed at a side surface of the lens 30, which is an opposite side to the side surface of the lens 30 butting to the second cover glass 500. The LED 10 is attached to the LED substrate 20. The LED substrate 20 is disposed in close contact with a second surface of the second heat dissipation plate 70. In the meantime, the second surface of the second heat dissipation plate 70 is in orthogonal direction to the first surface. Therefore, the heat generated in the LED 10 is dissipated to the second dissipation plate 70 through the LED substrate 20. In the meantime, the conductive sheet 33 is used for the adhesion between the LED substrate 20 and the second heat dissipation plate 70 to improve heat coupling. As described above, the heat generated in the LED 10 is mainly dissipated to the second heat dissipation plate 70.

Current is supplied to the LED 10 through the LED substrate 20. The power is supplied from outside to the LED substrate 20 through a socket 25, which is disposed at outer surface of the second heat dissipation plate 70. A hole or cut out are formed in the second heat dissipation plate 70 corresponding to the socket 25 to connect the socket 25 to the LED substrate 20.

In FIG. 6, the LED 10 and the incident surface of the lens 30 look in close contact, however, there a space of about 10 μm between them. An accuracy in such small dimension is determined by dimensional accuracy of the second heat dissipation plate 70 as a component level, attaching accuracy of the LED substrate 20, attaching accuracy of the lens 30 to the second heat dissipation plate 70 and an attaching accuracy of the LEDs 10 to the LED substrate 20. Since adhering the LED substrate 20 and the lens 30 to the second heat dissipation plate 70 is made before the second heat dissipation plate 70 is attached to the display device, in other words, those processes are made when the second heat dissipation plate 70 is in a single component, therefore, assembly accuracy can be got easily. By the way, the second heat dissipation plate 70 is formed from aluminum of a thickness of 0.5 mm, however, a thickness can be adjustable considering heat dissipation and accuracy in machining. By the way, if the second heat dissipation plate 70 is formed by press, a high dimensional accuracy can be acquired.

In FIG. 6, the light, which entered the lens 30 from LED 10, enters the second cover glass 500 through a side surface of the second cover glass 500. The light, which entered the second cover glass 500, is guided to the display area 1000 after repeating total reflections. A distance from an emitting surface of the lens 30 to an edge of the display area 1000 corresponds to a size of the terminal area of the TFT substrate 100 in the x direction. Some light does not make a total reflection in this region; therefore, embodiment 1 uses, e.g., a white PET (Polyethylene Terephthalate) for the spacer 110 to reflect the light which does not make a total reflection in this area, thus, light utilizing efficiency is raised.

In FIG. 6, the light emitted from the lens 30 reflects at a surface of the spacer 110, and make a total reflection at the second cover glass 500, then enters the liquid crystal layer 300. In the meantime, instead of the white PET, a resin bock, in which a reflection film is formed on the top, can be adhered on the terminal area of the TFT substrate 100 as the spacer 110. In any events, the spacer 110 is used to strengthen a mechanical strength of the TFT substrate 100, as well as used as a reflection component to raise a light utilization efficiency in embodiment 1.

On the other hand, a top of the second cover glass 500 is covered by the second heat dissipation plate 70 in an area corresponding to the terminal area of the TFT substrate 100 in a plan view; the second heat dissipation plate 70 reflects the light, which does not make a total reflection, to the second cover glass 500, thus, light utilizing efficiency is raised. In FIG. 6, the second heat dissipation plate 70 merely contacts the second cover glass 500, however, it does not adhere to the second cover glass 500 to avoid that a stress is transferred to the second cover glass 500. As described above, a lens unit, which includes the lens 30, the LED 10, the second light dissipation plate 70 and so forth, does not adhere to the second cover glass 500, thus, the second cover glass 500 can avoid a heat stress in the lens unit. As a result, an influence on the image quality due to deformation of the second cover glass 500 can be avoided. In other words, the lens unit, which includes the lens 30, the LED 10, the second heat dissipation plate 70 and so forth is fixed to the TFT substrate 100 through the first heat dissipation plate 60, which is adhered to the TFT substrate 100 via the conductive sheet 33, and the third heat dissipation plate 80, which is explained later.

Another feature of the present embodiment is that a distance d1 between the LED 10 and the driver IC 40, both are heat sources, can be made large. If the LED 10 and the driver IC 40 are disposed in a small distance in the terminal area of the TFT substrate 100, as in the conventional example, the temperature of the components become even higher than that in a case where each of the components is disposed alone due to synergy effect; as a result, a decrease in light emitting efficiency of the LED 10 becomes severe, and a probability of malfunction of the driver IC 40 increases.

In contrast, in the present embodiment, in a plan view, a large distance can be taken between the LED 10 and the driver IC 40, through the lens 30. In addition, a measure to suppress a temperature rise is taken in each of the LED 10 and the driver IC 40, thus, a temperature rise in LED 10 and the driver IC 40 can be suppressed.

In FIG. 6, a first heat dissipation plate 60 and a third surface of the second heat dissipation plate 70 extend in the x direction to the left and are connected with each other through a third heat dissipation plate 80. The third heat dissipation plates 80 are disposed in the y direction with a distance to avoid the flexible wiring substrate 50. Therefore, the flexible wiring substrates 50, which extend to outside, are not stopped by the third heat dissipation plate 80. A contact between the third heat dissipation plate 80 and the first heat dissipation plate 60, and, a contact between the third heat dissipation plate 80 and the second heat dissipation plate 70 are surface contacts, thus, heat resistance between those heat dissipation plates is small. In this embodiment, a conductive sheet 33 is sandwiched between the third heat dissipation plate 80 and the first heat dissipation plate 60, and, between the third heat dissipation plate 80 and the second heat dissipation plate 70, therefore, thermal contacts between those plates are further improved.

Therefore, according to the structure of FIG. 6, a temperature rise in the driving portion of the transparent liquid crystal display device can be suppressed, and temperatures in the entire driving portion can be made uniform. Consequently, a heat stress caused by the driving portion can be made smaller. That is to say, a deformation of the second cover glass 500 and so forth due to a heat stress are suppressed, and deterioration of the image quality can be suppressed.

Figure 7:
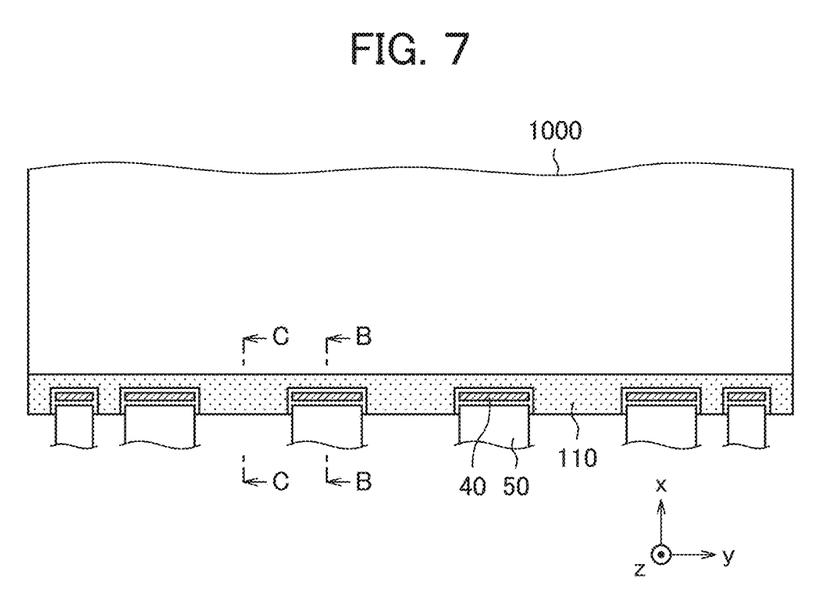
FIG. 7 is a plan view in which the TFT substrate and the counter substrate are assembled.

The transparent liquid crystal display device, explained in FIGS. 5 and 6, is further explained in detail according to manufacturing process, below. FIG. 7 is a plan view in which the TFT substrate 100 and the counter substrate 200 are assembled; the spacer 110 and the driver IC 40 are disposed on the terminal area of the TFT substrate 100; and the flexible wiring substrate 50 is connected to the terminal area. In FIG. 7, many terminal wirings are formed in the terminal area, however, they are covered by the spacer 110. The spacer 110 is adhered to the TFT substrate 100 to strengthen a mechanical strength of the terminal area of the TFT substrate 100.

In FIG. 7, a driver IC 40 is disposed corresponding to each of the flexible wiring substrates 50. In FIG. 7, small driver ICs 40 at both sides are driver ICs 40 for the scan signal lines. FIG. 7 is an example; in other examples, two driver ICs 40 for the video signal lines could be disposed in corresponding to each of the flexible wiring substrate 50.

Figure 8:
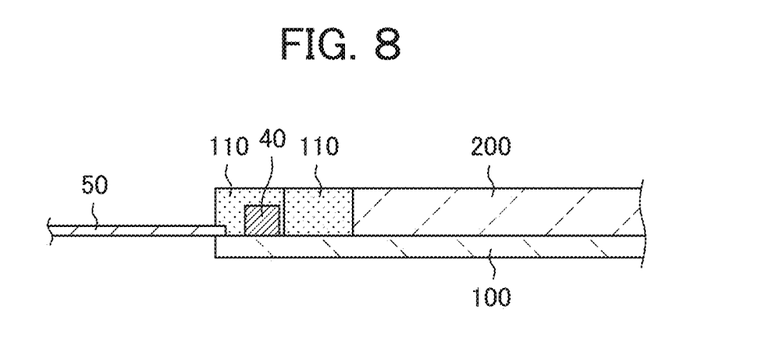
FIG. 8 is a cross sectional view of FIG. 7 along the line B-B.

FIG. 8 is a cross sectional view of FIG. 7 along the line B-B, in which the driver IC 40 exists. In FIG. 8, in the terminal area of the TFT substrate 100, the spacer 110 is adhered to the TFT substrate 100 with a same thickness as a thickness of the counter substrate 200 except a place in which the driver IC 40 and the flexible wring substrate 50 are disposed. It is because to strengthen a mechanical strength of the terminal of the TFT substrate 100.

Figure 9:
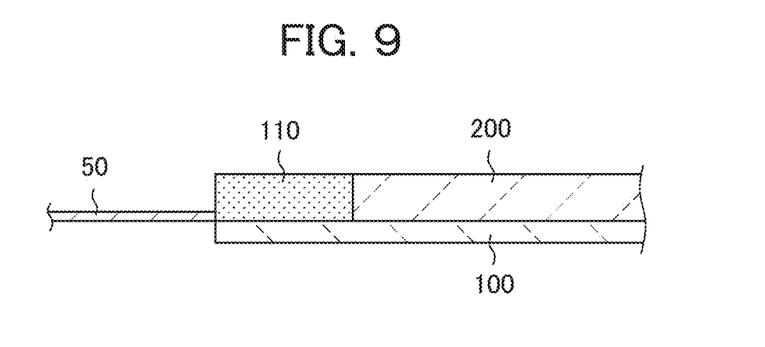
FIG. 9 is a cross sectional view of FIG. 7 along the line C-C.

FIG. 9 is a cross sectional view of FIG. 7 along the line C-C, in which the driver IC 40 and the flexible wring substrate 50 do not exist. In FIG. 9, in the terminal area of the TFT substrate 100, the spacer 110 is adhered to the terminal area. The spacer 110 is formed from, e.g., white PET; the spacer 110 reflects the light, which goes downward from the second cover glass 500, to the second cover glass 500 to raise a light utilizing efficiency.

Figure 10:
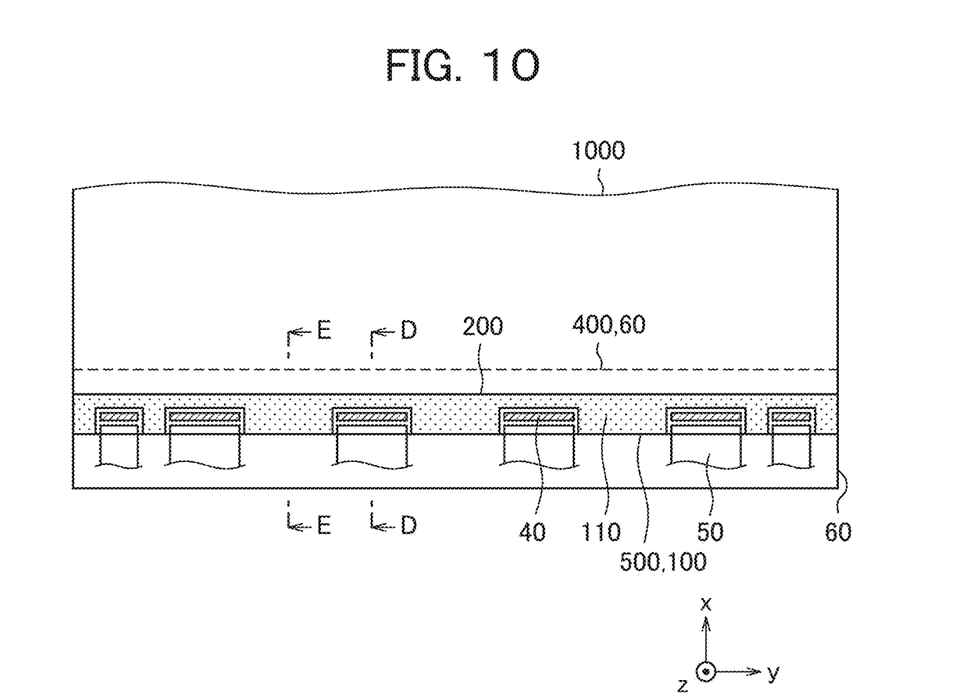
FIG. 10 is a plan view in which the first cover glass is disposed on the TFT substrate corresponding to the display area, the first heat dissipation plate is adhered to the terminal area, and the second cover glass is adhered to a surface of the counter substrate.
Figure 11:
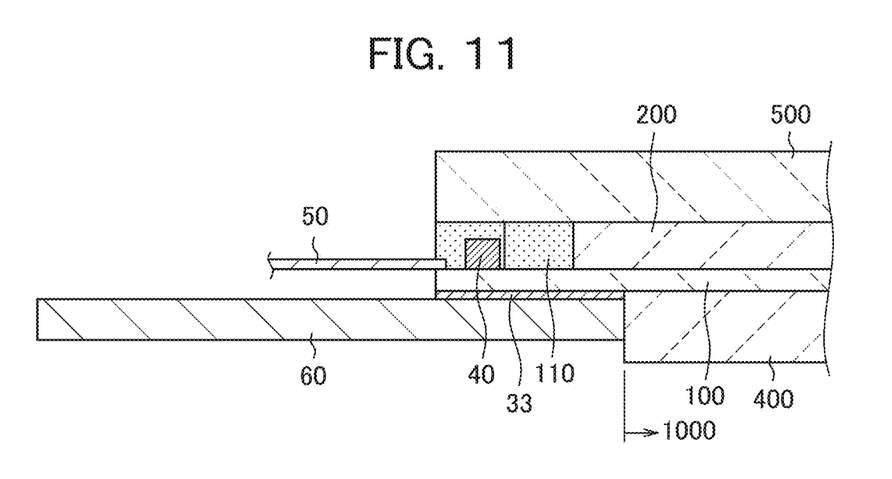
FIG. 11 is a cross sectional view of FIG. 10 along the line D-D.

FIG. 10 is a plan view in which the second cover glass 500 is disposed on a top of the counter substrate 200, the first cover glass 400 is disposed at the bottom of the TFT substrate 100 corresponding to the display area 1000, and the first heat dissipation plate 60 is disposed at the bottom of the TFT substrate 100 corresponding to the driving area, which includes the terminal area. FIG. 11 is a cross sectional view of FIG. 10 along the line D-D, in which the driver IC 40 exists.

In FIG. 11, the second cover glass 500, which is the same size as the TFT substrate 100, is disposed covering the terminal area formed in the TFT substrate 100. In FIG. 11, the counter substrate 200 and the second cover glass 500 are adhered to each other by, e.g., OCA. In this embodiment, the spacer 110 and the second cover glass 500 are not adhered to each other; however, if image quality is not influenced, the spacer 110 can be adhered to the second cover glass 500.

In FIG. 11, the first cover glass 400 is adhered to the TFT substrate 100 at a side corresponding to the display area 1000. The TFT substrate 100 and the first cover glass 400 are adhered to each other by OCA. The first heat dissipation plate 60 is adhered to the bottom of the TFT substrate 100 using the conductive sheet 33 at an area corresponding to the terminal area. The first heat dissipation plate 60, which is an aluminum plate of a thickness of 1 mm, works as a heat sink to the heat from the driver IC 40. The conductive sheet 33, which has adhesiveness at both surfaces, is used to dissipate heat more efficiently between the TFT substrate 100 and the first heat dissipation plate 60. The first heat dissipation plate 60 extends in left hand direction, and is connected with the second heat dissipation plate 70, on which the lens 30 and the LED 10 are disposed, through the third heat dissipation plate 80.

Figure 12:
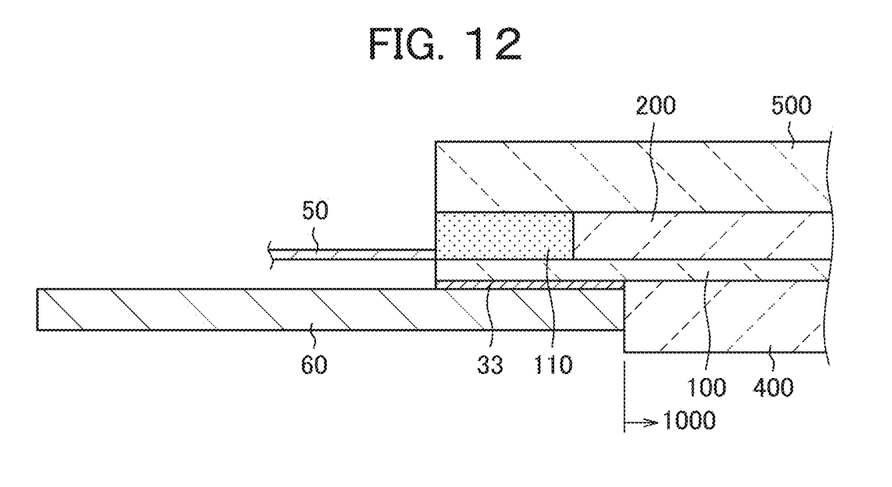
FIG. 12 is a cross sectional view of FIG. 10 along the line E-E.

FIG. 12 is a cross sectional view of FIG. 10 along the line E-E. The structure of FIG. 12 is the same as the structure of FIG. 11 except the terminal area formed in the TFT substrate 100. In FIG. 12, the spacer 110 is attached to the terminal area of the TFT substrate 100 in a same thickness as a thickness of the counter substrate 200. In FIG. 12, the spacer 110 is disposed in all the terminal area width since the driver IC 40 and the flexible wiring substrate 50 are not disposed in this area. Other portions are the same as FIG. 11, therefore, an explanation is omitted.

Figure 13:
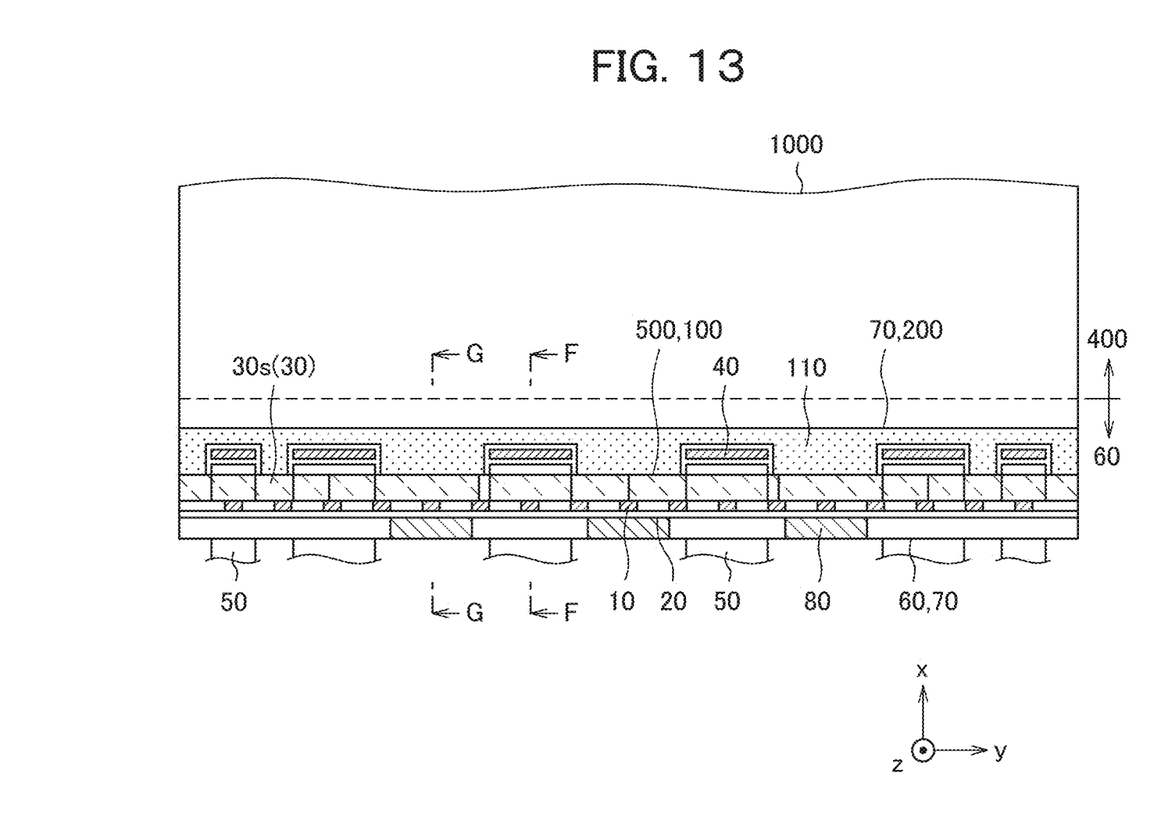
FIG. 13 is a plan view in which the lens is attached at an edge surface of the second cover glass and the LED is disposed at another surface of the lens.

FIG. 13 is a plan view in which the lens 30 is abutted on an edge of the second cover glass 500, and many LEDs 10 are disposed at opposing side of the lens 30 in addition to the structure of FIG. 10. In FIG. 13, a plurality of lenses are disposed in parallel in lateral direction (the y direction) to form a rectangle lens 30. The plurality of lens 30, six lenses in FIG. 13, are adhered to each other with adhesive material such as OCA. Alternatively, one rectangle lens 30 which is elongated in lateral direction (the y direction) can be used instead of the plurality of the lenses 30 connected in lateral direction (the y direction) as shown in FIG. 13. Many LEDs 10 are attached to one LED substrate 20. The LED substrate 20 is disposed in contacting with the second heat dissipation plate 70; however, since the second heat dissipation plate 70 covers all the components in FIG. 13, only a position of an edge of the second heat dissipation plate 70 is shown in FIG. 13.

In FIG. 13, the first heat dissipation plate 60, which is located in the rear surface, extends from an edge of the first cover glass 400 to lower direction (viewed in the x direction), and the second heat dissipation plate 70, which is located in the front surface, extends from a position corresponding to an edge of the counter substrate 200 to lower direction (viewed in the x direction) to overlap with a third heat dissipation plate 80. The third heat dissipation plate 80 connects thermally the first heat dissipation plate 60 and the second heat dissipation plate 70 to each other. In a plan view, the third heat dissipation plates 80 are disposed in lateral direction (viewed in the y direction) with a certain distance so that the flexible wiring substrates 50 can pass through between the third heat dissipation plates 80. The flexible wiring substrates 50 are to be connected to the printed circuit board (PCB) 600 as shown in FIG. 5.

Figure 14:
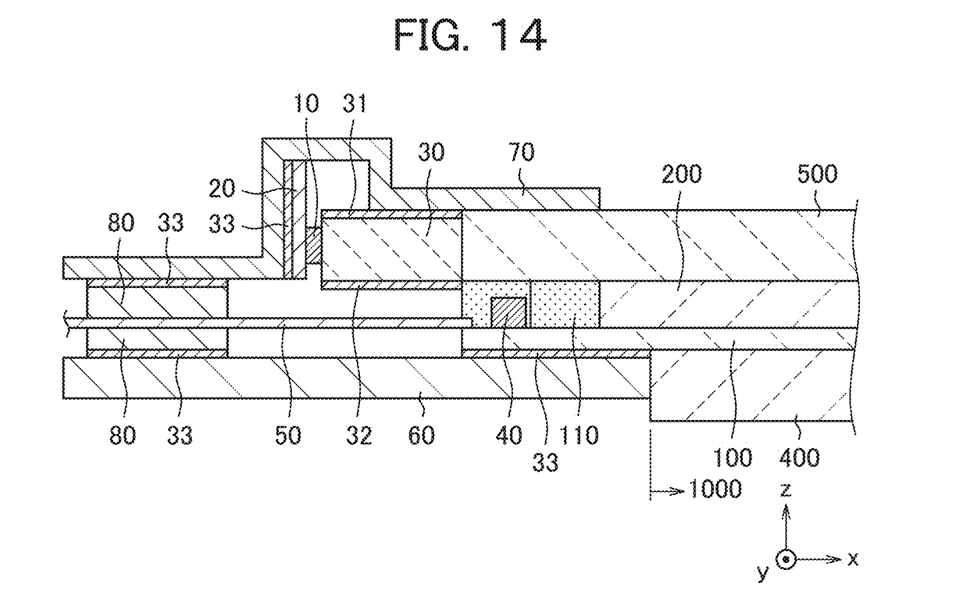
FIG. 14 is a cross sectional view of FIG. 13 along the line F-F.

FIG. 14 is a cross sectional view of FIG. 13 along the line F-F. In FIG. 14, the lens 30 is disposed at an edge of the second cover glass 500. The LED 10 is disposed at the opposing surface of the lens 30. The LED 10 is attached at the LED substrate 20, the LED substrate 20 is attached in contacting to a second surface of the second heat dissipation plate 70. The LED 10 generates heat; the heat is dissipated, through the LED substrate 20, in the second heat dissipation plate 70, which is formed from metal.

In FIG. 14, the lens 30 is attached to the first surface of the second heat dissipation plate 70 formed from metal through the adhesive sheet 31. The way how to dispose the lens 30 and the LED 10 is the same as explained as referring to FIG. 6. That is to say, the optical components such as the lens 30 and the LED 10 are attached to the second heat dissipation plate 70. Thus, the heat can be efficiently dissipated through the second heat dissipation plate 70.

The second heat dissipation plate 70 does not adheres to the second cover glass 500; if the second cover glass 500 gets a mechanical stress, display images are influenced. The second heat dissipation plate 70 extends in left hand direction in the x axis direction in FIG. 14, and is attached, at a third surface, to the first heat dissipation plate 60 through the third heat dissipation plate 80. As explained above, the second heat dissipation plate 70, in which optical components are disposed, is supported by the first heat dissipation plate 60, which is adhered to the back of the TFT substrate 100.

Since the first heat dissipation plate 60 is formed from aluminum of a thickness of approximately 1 mm, a shape of the first heat dissipation plate 60 is stable. The heat from the driver IC 40 conducts to the first heat dissipation plate 60 through the TFT substrate 100. The first heat dissipation plate 60 works as a heat sink as well as a measure of heat dissipation.

The spacer 110 is adhered to the terminal area of the TFT substrate 100, to which the first heat dissipation plate 60 is adhered, therefore, this portion is mechanically strengthened by the spacer 110. An abutting portion of the first heat dissipation plate 60 on the first cover glass 400 is located to the display area 1000 side than the edge of the counter substrate 200 to avoid a stress concentration in the TFT substrate 100 at the place corresponding to the edge of the counter substrate 200. Other structures in FIG. 14 are the same as explained in referring to FIG. 6.

Figure 15:
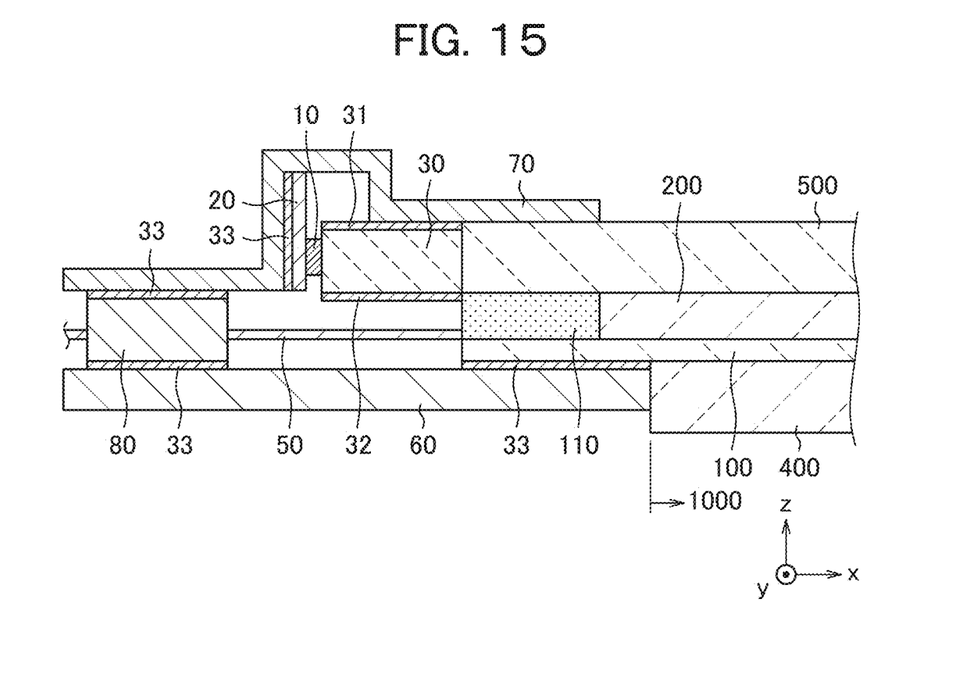
FIG. 15 is a cross sectional view of FIG. 13 along the line G-G.

FIG. 15 is a cross sectional view of FIG. 13 along the line G-G. FIG. 15 differs from FIG. 14 in that the driver IC 40 does not exist on the TFT substrate 100 in the cross-sectional view. The driver IC 40 and the flexible wiring substrate 50 are not formed on the terminal area of the TFT substrate 100 in FIG. 15, instead, the spacer 110 is formed in entire width of the terminal region. In FIG. 15, only the flexible wiring substrate 50 located back side of sheet (in the y direction) is visible.

As described above, the present invention has following features. A first feature is that the LED 10 and the driver IC 40, both are heat sources, are disposed at different components, thus, a distance between the LED 10 and the driver IC 40 can be made larger. Therefore, an extreme temperature rise, due to synergy effect of the heat from the LED 10 and the heat from the driver IC 40, can be avoided.

As shown in FIGS. 6 and 14, the heat generated in the driver IC 40 is absorbed by the first heat dissipation plate 60. On the other hand, the heat generated in the LED 10 is absorbed by the second heat dissipation plate 70. As explained above, each of the heat generated in the driver IC 40 and the heat generated in the LED 10 is dissipated through different routes. Since a distance between the LED 10 and the driver IC 40 can be made large, a phenomenon that the temperatures of the driver IC 40 and the LED 10 further increase by being influenced by another one can be avoided.

A second feature of the present invention is the optical components such as the lens 30, the LED 10 and so forth and the supporting components do not directly contact with the second cover glass 500. That is to say, as shown in FIGS. 6 and 14 and so forth, the light from the LED 10 enters the second cover glass 500 through the lens 30. Therefore, if the second cover glass 500 deforms due to a heat stress or the like, the display images are influenced. In the present invention, as shown in FIGS. 6 and 14 of embodiment 1, the lens 30 and the LED 10 are attached to the second heat dissipation plate 70; the second heat dissipation plate 70 is attached to the first heat dissipation plate 60 through the third heat dissipation plate 80. In FIGS. 6, 14 and so forth, a part of the second heat dissipation plate 70 extends on a surface of the second cover glass 500; however, this is to prevent a leak of light through the second cover glass 500 by the second heat dissipation plate 70, but the second heat dissipation plate 70 does not adhere to the second cover glass 500. Therefore, a mechanical stress for attaching the optical components or a heat stress when the LED 10 emits light, and so forth are not transferred to the second cover glass 500. Thus, a deterioration of display images due to a stress in the second cover glass 500 can be avoided.

A third feature of the present invention is to dispose a spacer 110 on the terminal area of the TFT substrate 100, on which the counter substrate 200 does not overlap with the TFT substrate 100; a thickness of the spacer 110 is approximately the same as a thickness of the counter substrate 200; and the spacer 110 is adhered to the terminal area, thus, a mechanical strength of the TFT substrate 100 at this portion is strengthened. Further, if the spacer 110 is formed from a reflective material such as PET and so forth, the light tries to go outside from the second cover glass 500 is reflected by the spacer 110 and the light is directed to the display area 1000.

As described above, according to the present invention, a decrease in light emitting efficiency of the LED 10 or malfunction of the driver IC 40 due to temperature rise can be suppressed, and the stress due to thermal expansion of the structural components can be mitigated; further, a deterioration of display images due to a stress in the second cover glass 500 can be suppressed; and, consequently, a transparent liquid crystal display device of high brightness and high contrast, or lower power consumption can be realized by raising a light utilizing efficiency.

What is claimed is:

1. A liquid crystal display device in which liquid crystal is sandwiched between a TFT substrate, having a pixel, and a counter substrate, the liquid crystal display device comprising:
   a display area being formed in an area in which the TFT substrate and the counter substrate overlap each other;
   a terminal area being formed on the TFT substrate, in which the counter substrate does not overlap;
   a driver IC being disposed on the terminal area;
   a first heat dissipation plate being adhered to a back of the TFT substrate in a portion corresponding the terminal area;

a second cover glass being disposed on the counter substrate;
a first edge of a lens being disposed at an edge of the second cover glass;
an LED as a light source being disposed at a second edge of the lens, which is an opposing edge to the first edge of the lens; and
a second heat dissipation plate, on which the lens and the LED are disposed, being disposed at a second cover glass side,
wherein the lens, the LED and the second heat dissipation plate are fixed to the TFT substrate through the first heat dissipation plate,
a cross section of the second heat dissipation plate has a bent structure,
the lens is disposed on a first surface of the second heat dissipation plate,
the LED is attached to a LED substrate, and
the LED substrate is attached to a second surface of the second heat dissipation plate.

2. The liquid crystal display device according to claim 1, wherein the second edge of the lens, which opposes to the LED, is located at an outer side than an edge of the TFT substrate with respect to the display area.

3. The liquid crystal display device according to claim 1, wherein the second cover glass covers the driver IC.

4. The liquid crystal display device according to claim 1, wherein the first surface is parallel to a major surface of the counter substrate, and
the second surface is orthogonal to the major surface of the counter substrate.

5. The liquid crystal display device according to claim 4, wherein a first cover glass is adhered to a back of the TFT substrate corresponding to the display area.

6. The liquid crystal display device according to claim 5, wherein the TFT substrate and the first heat dissipation plate are adhered to each other through a conductive sheet.

7. The liquid crystal display device according to claim 6, wherein an edge of the first heat dissipation plate and an edge of the first cover glass oppose to each other.

8. The liquid crystal display device according to claim 7, wherein a flexible wiring substrate is connected to the terminal area of the TFT substrate, and a spacer is formed on the terminal area except a place in which the driver IC and the flexible wiring substrate are disposed.

9. The liquid crystal display device according to claim 8, wherein a thickness of the spacer is the same as a thickness of the counter substrate.

10. The liquid crystal display device according to claim 9, wherein the spacer is formed from PET (Polyethylene Terephthalate).

11. The liquid crystal display device according to claim 9, wherein a basic material of the spacer is resin, a reflective material is formed at a top of the spacer.

12. The liquid crystal display device according to claim 6, wherein the second heat dissipation plate has a third surface, which is parallel to a major surface of the counter substrate, and
the first heat dissipation plate is connected with the third surface of the second heat dissipation plate through a third heat dissipation plate.

13. The liquid crystal display device according to claim 12, wherein the second heat dissipation plate covers a part of the second cover glass.

14. The liquid crystal display device according to claim 13, wherein, the second heat dissipation plat does not adhere to the second cover glass.

15. The liquid crystal display device according to claim 14, wherein the second heat dissipation plate is formed from metal.

16. The liquid crystal display device according to claim 15, wherein the first heat dissipation plate is formed from metal.

17. The liquid crystal display device according to claim 1, wherein a thickness of the TFT substrate is thinner than a thickness of the counter substrate.

18. The liquid crystal display device according to claim 1, wherein the liquid crystal has a structure in which fine particles including liquid crystal molecules inside are dispersed in a polymer, and a common electrode is formed on the counter substrate.

* * * * *